C. S. BURTON.
READING LIGHT.
APPLICATION FILED MAR. 17, 1919.
1,333,830.
Patented Mar. 16, 1920.
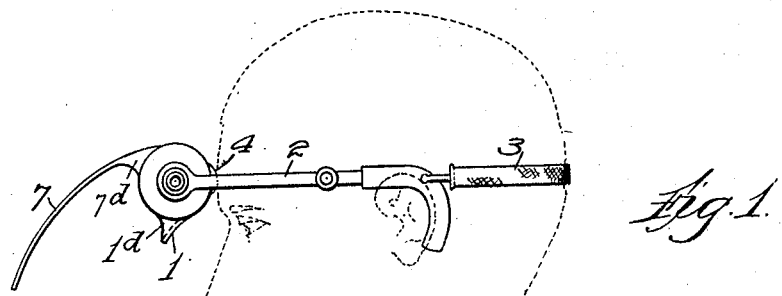
Fig. 1.
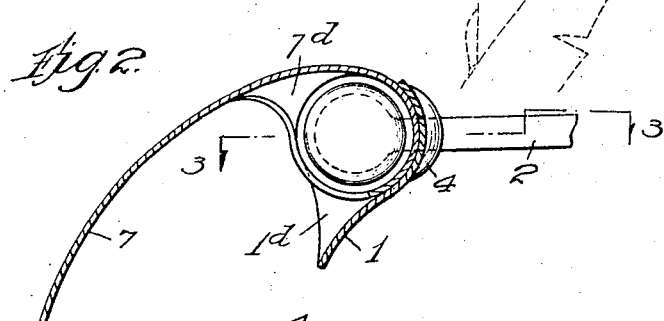
Fig. 2.
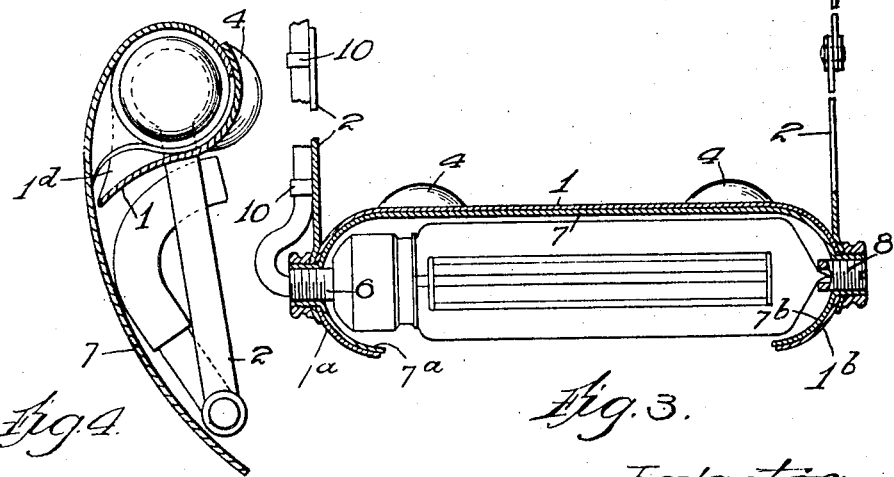
Fig. 3.
Fig. 4.
Inventor;
Charles S. Burton,
by Burton & Burton
his Atty's.
Witness;

UNITED STATES PATENT OFFICE.

CHARLES S. BURTON, OF OAK PARK, ILLINOIS.

READING-LIGHT.

1,333,830. Specification of Letters Patent. Patented Mar. 16, 1920.

Application filed March 17, 1919. Serial No. 283,143.

*To all whom it may concern:*

Be it known that I, CHARLES S. BURTON, a citizen of the United States, and a resident of Oak Park, in the county of Cook and State of Illinois, have invented certain new and useful Improvements in Reading-Lights, of which the following is a specification, reference being had to the accompanying drawings, forming a part thereof.

The purpose of this invention is to provide a reading light adapted to be mounted upon the forehead of the user, carrying an electric lamp to be energized by electric current derived from any convenient fixed socket or from a portable battery carried upon the person of the user. It consists in the elements and features of construction shown and described, as indicated in the claims.

In the drawings:

Figure 1 is a pictorial view showing the reading light embodying this invention in the position of use on the forehead of the user.

Fig. 2 is a transverse fore-and-aft section of the same.

Fig. 3 is an axial section at the line, 3—3, on Fig. 2.

Fig. 4 is a transverse section of the device folded up out of use.

The reading light embodying this invention comprises an eye-shade, 1, provided with means for securing it to the forehead of the user, the means shown in the drawings consisting of temple pieces, 2, 2, which project rearward from the opposite ends of the eye shade, and are provided with an elastic strap, 3, for connecting their rear ends to hold the device securely upon the head of the user. The eye-shade is preferably provided with pads, 4, 4, to rest against the forehead, thereby obviating the necessity of shaping the shade to different heads, and preventing the unpleasantness of an improperly shaped or ill-fitting shade. The eye-shade is formed at the opposite ends with ears, $1^a$ and $1^b$, one of which is adapted to receive a lamp socket, 6, which may serve also as the pivot at that end for connecting the eye shade and the reflector hereinafter described. 7 is a reflector having at its opposite ends ears, $7^a$, $7^b$, adapted to seat upon the ears, $1^a$ and $1^b$, of the eye shade, and to be pivoted thereto, the pivot at one end being, as above suggested, the stem of the lamp socket, while at the other end a special pivot, 8, is provided. Preferably the ears, $1^a$, $1^b$, of the eye shade, and the ears, $7^a$, $7^b$, of the reflector are spheroidal, adapted to seat one within the other, and thereby pivot upon each other without excessive wear upon the particular parts provided as the connecting pivotal elements, and also so that the inner surface of the inner pair of ears may be adapted for conserving the light by reflecting it inward to blend in the beam which is projected forward, as hereinafter more particularly stated. The upper or outer surface of the eye shade is convexly curved with a view to reflecting the light which falls upon it from the lamp into a downwardly and forwardly-projecting beam for lighting the page to be read or the work to be observed by the user. The reflector is interiorly concave and of proper approximation to parabolic form to project a forwardly and downwardly converged beam properly spread for lighting a surface having a moderate fore-and-aft extent which may be presumed to be within the range of clear vision of the user. Both the eye shade and the reflector may have lateral flanges, $1^d$, and $7^d$, having their interior surfaces reflective for conserving the light against lateral dispersions beyond the desired range of vision of the user.

The reflector and the eye shade are desirably adapted to be folded together to inclose the lamp between them so that the device may be stored with safety against breakage of the lamp, the intention being that it will be of such size that it can be conveniently carried in the pocket of the user. For the same reason the temple pieces are pivotally connected, as stated, at the pivot of the eye shade and reflector to each other, so that said temple pieces can be folded forward from their normal position of use, projecting rearward, around into a plane between the forwardly projecting eye-shade and reflector, so that the entire device can be folded up into a compass not exceeding in one direction the fore-and-aft dimension of the reflector, and not exceeding in a transverse direction the distance of spread between the eye-shade and the reflector when they are folded together to inclose the lamp.

Preferably one of the temple pieces is provided with eyelets, 10, 10, or other equivalent means for supporting and guiding the lamp-energizing wires which may be thus conducted so as to hang over the shoulder of the user and be out of danger of accidental engagement by the hands or sleeve or book or paper in the hand of the user. Preferably also the temple pieces may be hinged about midway in their length to fold back within the compass of the other parts,—eye shade and reflector,—when they are folded together for carrying, as shown in Fig. 4.

I claim:—

1. A reading light comprising in combination with an eye shade adapted to be held to the head of the user, a lamp socket mounted thereon for positioning a lamp above the eye shade, and a reflector formed for projecting a beam of light down and forwardly, mounted above the lamp position, the reflector being pivoted to the eye shade for folding there-toward to inclose the lamp.

2. A reading lamp comprising in combination with an eye-shade adapted to be held to the head of the user, a lamp socket mounted thereon for positioning a lamp above the eye shade, a reflector formed for projecting a beam of light down and forwardly mounted above the lamp position, and temple pieces pivoted about the axis of the lamp socket, for folding from operative position projecting rearward, into a plane between the operative positions of the eye shade and the reflector.

3. In the construction defined in claim 2 foregoing, the temple pieces being each made of two parts pivoted together for folding substantially into the compass of the reflector.

4. In the construction defined in claim 1, the eye shade being convex toward the lamp and the reflector being concave there-toward, the general direction of both surfaces being obliquely downward and forward.

5. A reading light comprising in combination with an eye shade adapted to be held to the head of the user, a lamp socket mounted thereon for positioning a lamp above the eye shade, and a reflector, formed for projecting a beam of light down and forwardly, mounted above the lamp position and pivoted to the eye shade for folding about a transverse horizontal axis; the reflector and eye shade having the bearings by which they are pivoted one to the other spheroidal about said axis.

6. A reading light comprising in combination with an eye shade adapted to be held to the head of the user, a reflector mounted above and extending down forwardly of the shade, the reflector and shade being pivoted together for folding about a transverse horizontal axis; a lamp socket mounted for holding a lamp between the shade and the reflector, the stem of the socket being co-axial with the pivotal connections between the shade and reflector and means for holding the device to the head of the user extending from said pivotal connection.

7. A reading light comprising in combination, a lamp socket, an eye shade and a reflector pivotally connected together about the stem of the lamp socket at one side, and having like pivotal connection co-axial therewith at the other side, and means for holding the device to the head of the user extending from said pivotal connection to the other side respectively.

8. In the construction defined in claim 7 foregoing, the second mentioned pivotal connection having at the center thereof a centering screw adjustable from the outer end axially, adapted to afford a center bearing for the end of a lamp mounted in the socket.

In testimony whereof, I have hereunto set my hand at Chicago, Illinois, this 13th day of March, 1919.

CHARLES S. BURTON.